(12) United States Patent
Rasanen

(10) Patent No.: US 10,116,490 B2
(45) Date of Patent: Oct. 30, 2018

(54) USAGE CONTROL FOR SUBSCRIBER GROUP

(75) Inventor: Juha Antero Rasanen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 326 days.

(21) Appl. No.: 14/426,838

(22) PCT Filed: Sep. 7, 2012

(86) PCT No.: PCT/EP2012/067463
§ 371 (c)(1),
(2), (4) Date: Mar. 9, 2015

(87) PCT Pub. No.: WO2014/037047
PCT Pub. Date: Mar. 13, 2014

(65) Prior Publication Data
US 2015/0236891 A1   Aug. 20, 2015

(51) Int. Cl.
*H04L 12/24* (2006.01)
*H04L 29/08* (2006.01)

(52) U.S. Cl.
CPC .......... *H04L 41/046* (2013.01); *H04L 67/141* (2013.01)

(58) Field of Classification Search
CPC ... G06F 15/16; G06F 21/554; H04L 41/0893; H04L 45/00; H04L 45/72
USPC .......................... 709/204, 223; 370/328, 345
See application file for complete search history.

(56) References Cited

U.S. PATENT DOCUMENTS

| | | | | |
|---|---|---|---|---|
| 5,508,169 A | * | 4/1996 | Deugau | C12Q 1/6855 435/6.1 |
| 6,507,643 B1 | * | 1/2003 | Groner | H04L 51/066 379/88.14 |
| 7,211,414 B2 | * | 5/2007 | Hardin | C07H 19/06 435/6.1 |

(Continued)

FOREIGN PATENT DOCUMENTS

EP      2 493 221 A1    8/2012

OTHER PUBLICATIONS

3GPP TS 29.212 V12.0.0 (Mar. 2013) "3rd Generation Partnership Project; Technical Specification Group Core Network and Terminals; Policy and Charging Control (PCC); Reference points (Release 12)"; 198 pages; 3rd Generation Partnership Project (3GPP); Mobile Competence Centre; 650, Route des Lucioles; F-06921 Sophia-Antipolis Cedex; France.

(Continued)

*Primary Examiner* — Tesfay Yohannes
(74) *Attorney, Agent, or Firm* — Squire Patton Boggs (US) LLP

(57) ABSTRACT

A method for use by an apparatus of a communication network comprises detecting (S22) that a user or user equipment attaching to the communication network belongs to a usage group, based on group identity information that is allocated to the user or user equipment and identifies the usage group, detecting (S24), based on the group identity information, whether or not a first rules function out of several rules functions has been allocated to another user or user equipment of the usage group, and in case it is detected that the first rules function has been allocated to another user or user equipment of the usage group, selecting (S26), for the user or user equipment, the first rules function.

8 Claims, 5 Drawing Sheets

(56) References Cited

U.S. PATENT DOCUMENTS

| | | | | |
|---|---|---|---|---|
| 7,574,208 | B2* | 8/2009 | Hanson | H04L 1/188 370/345 |
| 8,224,900 | B2* | 7/2012 | Dutta | G06F 15/16 370/352 |
| 8,831,589 | B2* | 9/2014 | Xi | H04W 36/0055 370/331 |
| 9,338,862 | B2* | 5/2016 | Noesner | H05B 37/0272 |
| 2012/0224536 | A1* | 9/2012 | Hahn | H04L 45/00 370/328 |
| 2013/0104203 | A1* | 4/2013 | Davis | H04L 9/3231 726/5 |
| 2014/0233390 | A1* | 8/2014 | Schmid | H04L 47/125 370/236 |
| 2015/0365787 | A1* | 12/2015 | Farrell | H04W 4/02 455/456.1 |

OTHER PUBLICATIONS

3GPP TS 29.215 V12.0.0 (Jun. 2013) "3rd Generation Partnership Project; Technical Specification Group Core Network and Terminals; Policy and Charging Control (PCC) over S9 reference point; Stage 3 (Release 12)"; 83 pages; 3rd Generation Partnership Project (3GPP); Mobile Competence Centre; 650, Route des Lucioles; F-06921 Sophia-Antipolis Cedex; France.

International Search Report and Written Opinion dated May 27, 2013 corresponding to International Patent Application No. PCT/EP2012/067463.

Zte, "Solutions on usage monitoring for subscriber group—key issue 5," 3GPP TSG SA WG2 Meeting #92, S2-122926, Jul. 9-13, 2012 Barcelona, Spain, XP05063347, 10 pages.

3GPP TS 23.203 V11.6.0 (Jun. 2012), Technical Specification, 3rd Generation Partnership Project; Technical Specification Group Services and System Aspects; Policy and charging control architecture (Release 11), Jun. 15, 2012, pp. 1-177, XP050580708.

3GPP TR 23.858 V0.6.1 (Aug. 2012), Technical Report, 3rd Generation Partnership Project; Technical Specification Group Services and System Aspects; Usage Monitoring Control PCC Enhancement; (Release 12), Aug. 10, 2012, pp. 1-20, XP050649010.

* cited by examiner

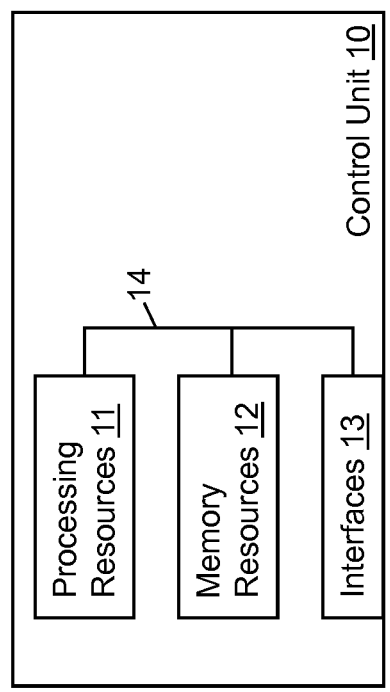

USAGE CONTROL FOR SUBSCRIBER GROUP

BACKGROUND OF THE INVENTION

Field of the Invention

The present invention relates to usage control for a subscriber group.

Related Background Art

The following meanings for the abbreviations used in this specification apply:

3GPP 3$^{rd}$ generation partnership project
AF application function
BBERF bearer binding and event reporting function
CAN connectivity access network
DRA diameter routing agent
GW gateway
ID identity, identifier
IMSI international mobile subscriber identity
IP internet protocol
OCS online charging system
OFCS offline charging system
PCC policy and charging control
PCEF policy and charging enforcement function
PCRF policy and charging rules function
PDN packet data network
P-GW packet data network gateway
QoS quality of service
SPR subscription profile repository
TDF traffic detection function
TR technical report
UDR user data repository
UE user equipment Usage monitoring can be applied to an accumulated usage of network resources on a per IP-CAN session and user basis. This capability is required for enforcing dynamic policy decisions based on the total network usage in real-time.

A PCRF that uses usage monitoring for making dynamic policy decisions sets and sends applicable thresholds to a PCEF or TDF for monitoring. The usage monitoring thresholds may be based e.g. on volume or on actively used time. The PCEF or TDF notifies the PCRF when a threshold is reached and reports the accumulated usage since the last report for usage monitoring.

The usage monitoring capability can be applied to an individual service data flow, a group of services data flows, or to all traffic of an IP-CAN session in the PCEF. Usage monitoring, if activated, is performed both for service data flows associated with predefined PCC rules and dynamic PCC rules, including rules with deferred activation and/or deactivation times while those rules are active.

A usage monitoring group, when only a single user/UE is concerned, is a set of service data flow(s)/application(s) of a user/UE that share a common traffic usage allowance and need to be monitored together for usage monitoring control purposes. Within a wider concept addressed in this document, a usage monitoring group comprises service data flows/applications of several users/UEs that share a common traffic usage allowance and need to be monitored together for usage monitoring control purposes.

If subscribers/users/UEs of a given usage monitoring group are in different PCRF domains, there will be a coordination problem between the involved PCRFs: Procedures have to be defined between the involved PCRFs to exchange information and to manage the usage monitoring control, either with a centralized or distributed way. Either way, centralized or distributed, the following further problems will occur:

Monitoring control information and reports of achieved threshold values should be dynamically exchanged between the involved PCRFs, meaning increased signaling traffic between the PCRFs and extra processing load in the PCRFs.

The more network entities there are in the information exchange and decision making chain, the more delay there will be between triggering events and policy enforcement actions.

SUMMARY OF THE INVENTION

The present invention aims at overcoming the above drawbacks. For example, the invention aims at enabling coordinated usage control for a subscriber group, which avoids extra processing load in PCRFs and delays between triggering events and policy enforcement actions.

This is achieved by the method and apparatus as defined in the appended claims. The invention may also be implemented by a computer program product.

According to the invention, it can be ensured that users/UEs belonging to the same usage group will end up using the same (home) PCRF, when attaching to the network and establishing an IP-CAN session.

In the following the invention will be described by way of embodiments thereof with reference to the accompanying drawings.

BRIEF DESCRIPTION OF THE DRAWINGS

FIG. 5 shows a schematic block diagram illustrating a configuration of a control unit in which examples of embodiments of the invention are implementable.

DESCRIPTION OF THE EMBODIMENTS

Figure 1:
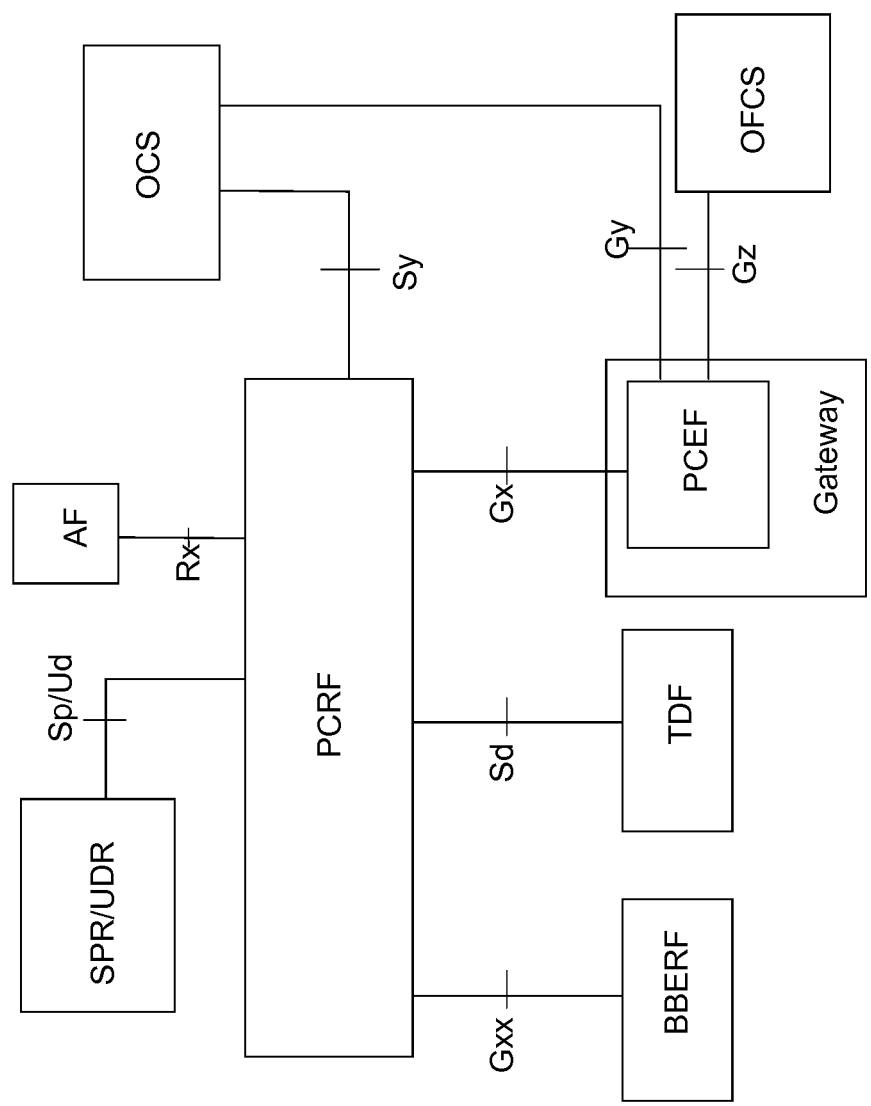
FIG. 1 shows a schematic block diagram illustrating an environment to which the present invention can be applied.

FIG. 1 shows a schematic block diagram illustrating a logical architecture of a PCC functionality to which the present invention may be applied. The PCC functionality is comprised by the functions of a PCEF included in a gateway node, a BBERF, a PCRF, an AF, a TDF, an OCS, an OFCS and an SPR or UDR.

The PCEF is connected to the PCRF, the OCS and the OFCS via Gx, Gy and Gz interfaces, respectively.

The PCRF is connected to the BBERF, the AF, the TDF and the OCS via Gxx, Rx, Sd and Sy interfaces, respectively.

The SPR/UDR is applied to store PCC related subscription data. An Sp/Ud interface between PCRF and SPR/UDR is used to access subscription data in the SPR/UDR. The PCC architecture extends the architecture of an IP-CAN, where the PCEF is a functional entity in a gateway node implementing IP access to a PDN.

According to an embodiment of the invention, the membership of a user/UE in a usage group is identified by group identity information, e.g. a parameter (Subscriber Group ID), in the user's subscription data in a subscriber database, e.g. the SPR/UDR. In addition to a user ID and/or IP address used for binding sessions of the same user or IP-CAN session to the same PCRF, the group identity information is used for binding users/UEs or IP-CAN sessions of different users to the same PCRF.

Figure 2:
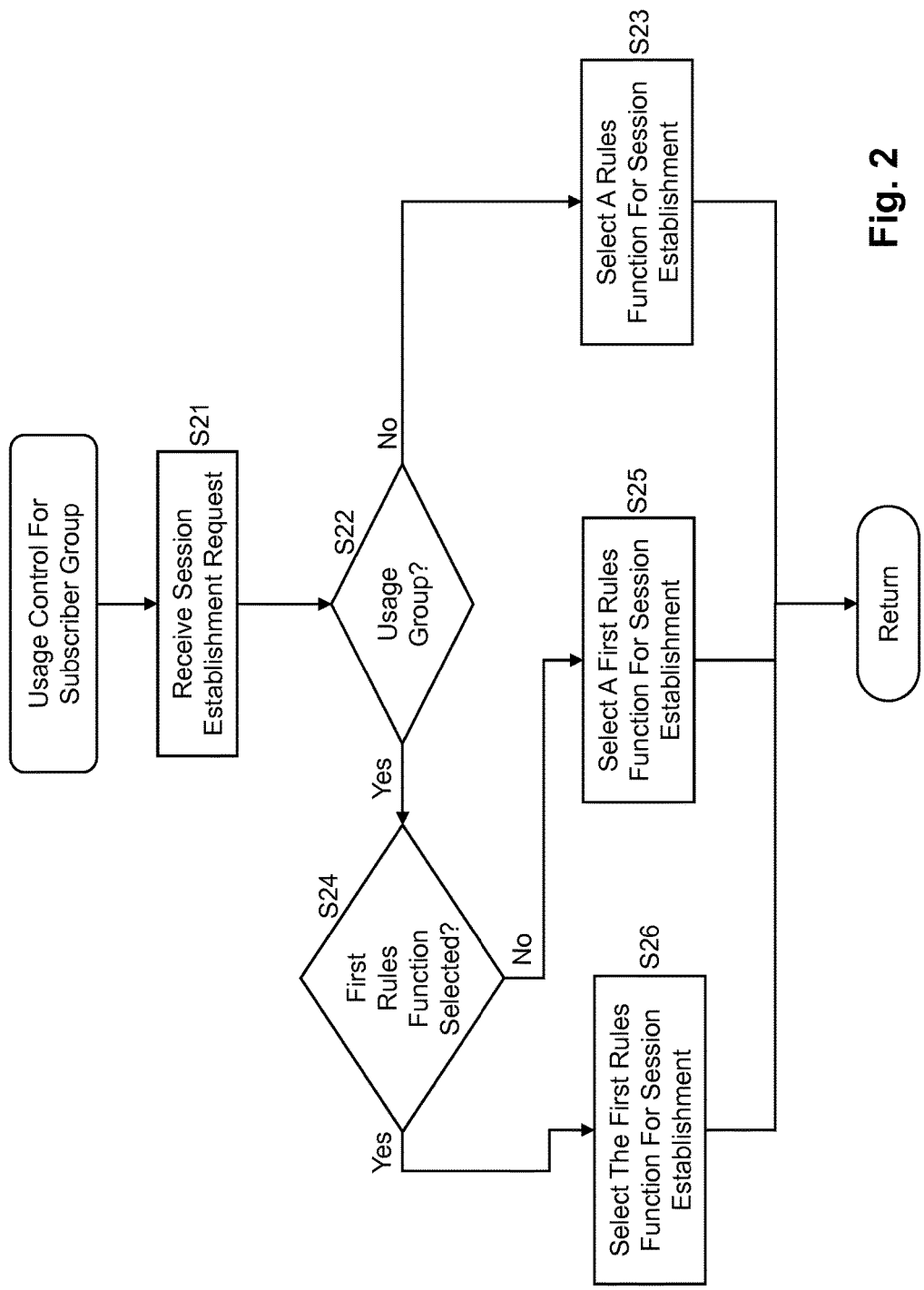
FIG. 2 shows a flow chart illustrating usage control for a subscriber group according to an embodiment of the invention.

FIG. 2 shows a flow chart illustrating usage control for a subscriber group according to an embodiment of the invention.

In step S21, a session establishment request for a user/user equipment is received. In step S22, it is detected if the user/user equipment belongs to a usage group, based on group identity information that is allocated to the user/user equipment and identifies the usage group. In case the user/user equipment does not belong to a usage group (No in S22), the process advances to step S23 in which a rules function, e.g. a PCRF, is selected according to a usual procedure.

In case it is detected in step S22 that the user/user equipment belongs to a usage group (Yes in S22), the process advances to step S24 in which it is detected, based on the group identity information, whether or not a rules function (first rules function) out of several rules functions has been allocated to another user/user equipment of the same usage group. In case it is detected that no rules function has been allocated to users/user equipments of the usage group (No in S24), the process advances to step S25 in which a rules function (first rules function), e.g. a PCRF, is selected according to a usual procedure.

In case it is detected that the first rules function has been allocated (Yes in S24), the process advances to step S26 in which the first rules function is selected for the user equipment.

The above process may be performed by a DRA supporting session establishment for the user equipment (UE) between a PCEF and a PCRF shown in FIG. 1.

According to an embodiment of the invention, when a UE attaches to a communication network and an IP-CAN session is established, the PCEF contacts the DRA for finding/discovering a PCRF for the UE or IP-CAN session. This event triggers the DRA to find out whether the user/UE belongs to a usage group. This can be done by acquiring/requesting (from the subscription database) the possible Subscriber Group ID (or IDs) allocated to the user and corresponding to the user ID received within the IP-CAN session establishment.

The DRA checks whether it has already allocated a PCRF to another user/IP-CAN session that uses the same Subscriber Group ID, i.e. belongs to the same usage group (see step S24). If yes, the DRA selects that PCRF (step S26). If no, the DRA selects a PCRF based on usual procedures (step S25).

In the following, implementation examples will be described in which a usage monitoring group is taken as an example of a usage group, wherein the common resource for the usage group is a data volume or time based quota. In general, the basis of and purpose for the usage group can be to control and manage not just a data volume or time based quota but any resources, e.g. bearers in general or bearers dedicated to specific type of services/applications or bearers with specific/dedicated quality requirements or bit rates/bandwidth on a common or shared bearer or applications/services using common/shared bearer resources, meant to be available to or used by the members of the usage group.

Figure 3:
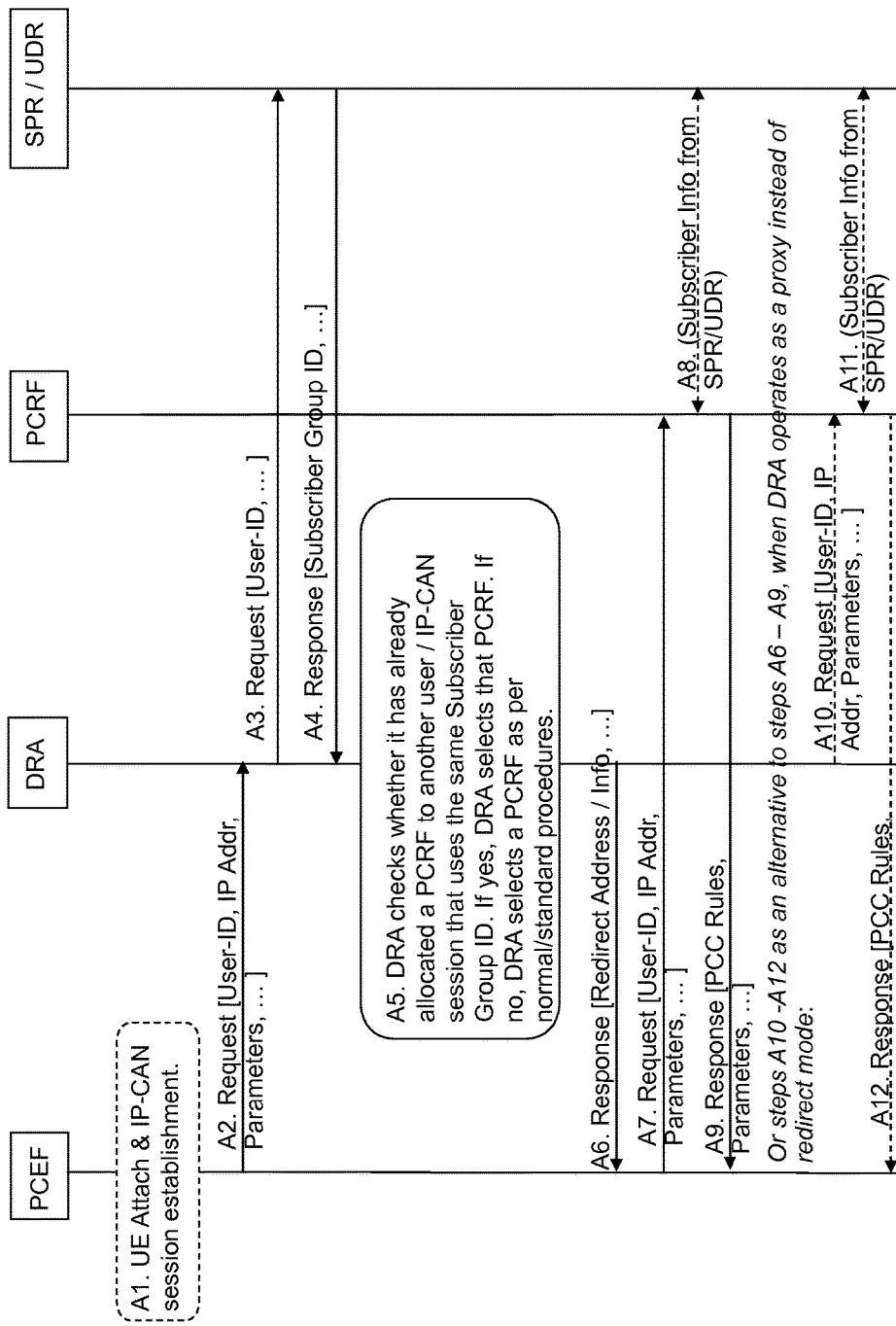
FIG. 3 shows a signaling diagram illustrating a first implementation example of the invention.

FIG. 3 shows a signaling diagram illustrating a first implementation example of the invention. In the first implementation example, a DRA is supposed to have a similar Sp/Ud interface to a subscription database (SPR/UDR) as a PCRF has as shown in FIG. 1.

When a UE attaches to a communication network and an IP-CAN session is established (step A1), a PCEF contacts the DRA for finding/discovering a PCRF for the UE or IP-CAN session (step A2). The DRA sends a request (step A3) to the SPR/UDR to find out whether the user/UE belongs to a usage monitoring group, and if yes, to get the Subscriber Group ID parameter/parameters (step A4).

In step A5, the DRA checks whether it has already allocated a PCRF to another user/IP-CAN session that uses the same Subscriber Group ID, i.e. belongs to the same usage monitoring group. If yes, the DRA selects that PCRF. If no, the DRA may select a PCRF according to a usual procedure (not shown in FIG. 3).

When the DRA operates in a redirect mode, in step A6 the DRA sends a response message to the PCEF in which the PCEF is redirected to the selected PCRF. In steps A7-A9 session establishment between the PCEF and the selected PCRF is performed, possibly using also subscriber information from the SPR/UDR.

Alternatively, when the DRA operates as a proxy instead of operating in the redirect mode, the DRA requests the session establishment from the selected PCRF (step A10) which may obtain the subscriber information from the SPR/UDR (step A11) and responds to the PCEF with PCC rules, parameters, etc. (step A12).

Figure 4:
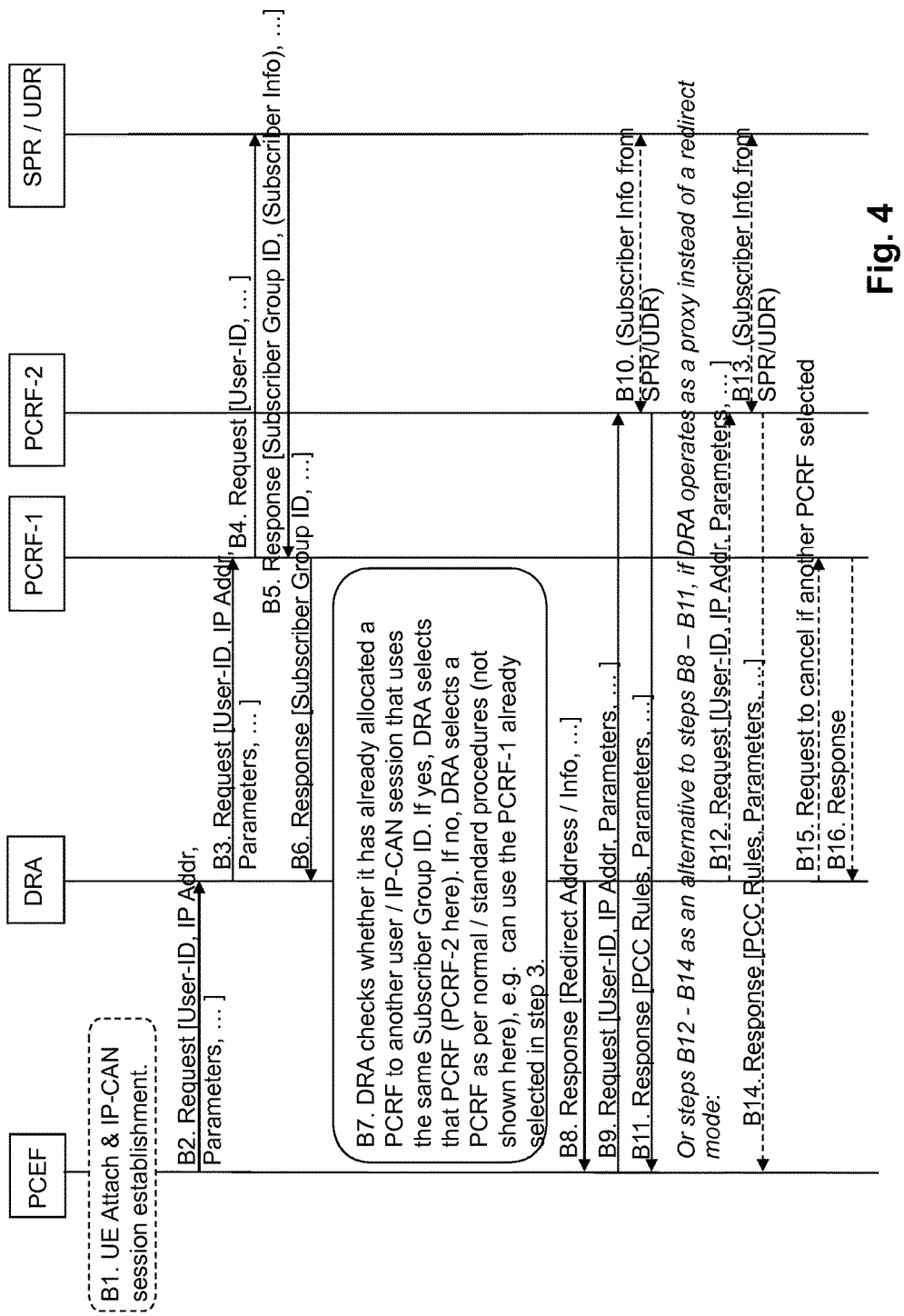
FIG. 4 shows a signaling diagram illustrating a second implementation example of the invention.

FIG. 4 shows a signaling diagram illustrating a second implementation example of the invention. In the second implementation example a DRA does not have an interface to a subscription database (SPR/UDR).

When a UE attaches to a communication network and an IP-CAN session is established (step B1), a PCEF contacts the DRA for finding/discovering a PCRF for the UE or IP-CAN session (step B2). The DRA may select a PCRF according to a usual procedure (step B3) (PCRF-1 in FIG. 4) and let the PCRF get subscription data of the UE from the SPR/UDR (steps B4 and B5) and forward it to the DRA (step B6). Alternatively, step B3 may be a dedicated request from the DRA to the PCRF to find out whether the user/UE belongs to a usage monitoring group, and if yes, to provide the DRA with the Subscriber Group ID parameter/parameters.

In step B7 the DRA checks whether it has already allocated a PCRF to another user/IP-CAN session that uses the same Subscriber Group ID, i.e. belongs to the same usage monitoring group. If yes, the DRA selects that PCRF (PCRF-2 in FIG. 4). If no, the DRA may select a PCRF according to a usual procedure (not shown in FIG. 4), e.g. can use the PCRF-1 already selected in step B3.

If the DRA selects a PCRF already used for the group (PCRF-2 in FIG. 4), the DRA may have to send a cancellation message (step B15, cancellation response in step B16) to the PCRF contacted first upon the IP-CAN session establishment in step B3 (PCRF-1 in FIG. 4), to cancel the connection towards the rules function contacted in step B3 (PCRF-1 in FIG. 4), depending on how the message exchange in steps B3 and B6 between DRA and PCRF is defined.

When the DRA operates in a redirect mode, in step B8 the DRA sends a response message to the PCEF in which the PCEF is redirected to the selected PCRF (PCRF-2 in FIG. 4). In steps B9-B11, session establishment between the PCEF and the selected PCRF is performed, possibly using also the subscriber information from the SPR/UDR.

Alternatively, when the DRA operates as a proxy instead of operating in the redirect mode, the DRA requests the session establishment from the selected PCRF (step B12) which may obtain the subscriber information from the SPR/UDR (step B13) and responds to the PCEF with PCC rules, parameters, etc. (step B14).

Now reference is made to FIG. 5 for illustrating a simplified block diagram of an electronic device that is suitable for use in practicing the exemplary embodiments of this invention.

A control unit 10, which may be part of or used by a DRA shown in FIGS. 3 and 4, or may implement the process illustrated in FIG. 2, comprises processing resources 11, memory resources 12 and interfaces 13 which are connected by a link 14. The memory resources 12 may include a program comprising program instructions that, when executed by the processing resources, enable the electronic device to operate in accordance with the exemplary embodiments of this invention, as detailed above.

In general, the exemplary embodiments of this invention may be implemented by computer software stored in the memory resources 12 and executable by the processing resources 11 of the control unit 10, or by hardware, or by a combination of software and/or firmware and hardware in the control unit 10.

The memory resources 12 may be of any type suitable to the local technical environment and may be implemented using any suitable data storage technology, such as semiconductor-based memory devices, magnetic memory devices and systems, optical memory devices and systems, fixed memory and removable memory. The processing resources 11 may be of any type suitable to the local technical environment, and may include one or more of general purpose computers, special purpose computers, microprocessors, digital signal processors (DSPs) and processors based on a multi-core processor architecture, as non-limiting examples.

According to an aspect of the invention, an apparatus of a communication network, which may comprise or use the control unit 10, e.g. the DRA as shown in FIG. 3 or 4, and/or which may execute the process shown in FIG. 2, comprises means for detecting that a user or user equipment attaching to the communication network belongs to a usage group, based on group identity information that is allocated to the user or user equipment and identifies the usage group, means for detecting, based on the group identity information, whether or not a first rules function out of several rules functions has been allocated to another user or user equipment of the usage group, and means for, in case it is detected that the first rules function has been allocated to another user or user equipment of the usage group, selecting, for the user or user equipment, the first rules function.

The means for detecting that a user or user equipment attaching to the communication network belongs to a usage group may comprise means for requesting the group identity information from a database based on an identifier of the user or user equipment, received with a session establishment request for the user or user equipment.

Alternatively, the means for detecting that a user or user equipment attaching to the communication network belongs to a usage group may comprise means for selecting a rules function of the several rules functions, and means for requesting the group identity information from the selected rules function based on an identifier of the user or user equipment, received with a session establishment request for the user or user equipment. The apparatus may further comprise means for, in case it is detected that the first rules function has not been allocated to another user or user equipment of the usage group, using, for the user or user equipment, the selected rules function. Otherwise, the apparatus may comprise means for, in case it is detected that the first rules function has been allocated to another user or user equipment of the usage group, sending a cancellation message to cancel the connection towards the selected rules function.

The apparatus may further comprise means for sending a redirect message to redirect the user or user equipment to the first/selected rules function, for requesting the session establishment from the first/selected rules function.

Alternatively, the apparatus may comprise means for sending a request message to request the session establishment from the first/selected rules function.

The usage group may manage usage of at least one of bearers common to/shared by the usage group, bit rates/bandwidth on a bearer common to/shared by the usage group, and applications/services using a bearer common to/shared by the usage group.

The usage group may comprise a usage monitoring group for monitoring volume or time based usage of resources shared by the usage monitoring group.

The means for detecting, selecting, requesting, using and sending may be implemented by the processing resources 11, memory resources 12 and interfaces 13 of the control unit 10.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method for use by an apparatus of a communication network, the method comprising:
receiving a session establishment request for a user or user equipment attaching to the communication network;
detecting that the user or user equipment belongs to a usage group, based on group identity information that is allocated to the user or user equipment and identifies the usage group, wherein the detecting comprises requesting the group identity information from a database based on an identifier of the user or user equipment received with the session establishment request for the user or user equipment;
detecting, based on the group identity information, whether or not a first rules function out of several rules functions has been allocated to another user or user equipment of the usage group;
in case it is detected that the first rules function has been allocated to another user or user equipment of the usage group, selecting, for the user or user equipment, the first rules function and
sending a request message to request the session establishment from the first rules function or sending a redirect message to redirect the user or user equipment to the first rules function, for requesting the session establishment from the first rules function.

2. An apparatus of a communication network, the apparatus configured to:
receive a session establishment request for a user or user equipment attaching to the communication network;
detect that the user or user equipment belongs to a usage group, based on group identity information that is allocated to the user or user equipment and identifies the usage group, wherein the apparatus, to detect that a user or user equipment network belongs to a usage group, is configured to request the group identity information from a database based on an identifier of the user or user equipment, received with the session establishment request for the user or user equipment;

detect, based on the group identity information, whether or not a first rules function out of several rules functions has been allocated to another user or user equipment of the usage group;

in case the apparatus detects that the first rules function has been allocated to another user or user equipment of the usage group, select, for the user or user equipment, the first rules function and send a request message to request the session establishment from the first rules function or send a redirect message to redirect the user or user equipment to the first rules function, for requesting the session establishment from the first rules function.

3. The apparatus of claim 2, wherein the usage group manages usage of at least one of bearers common to/shared by the usage group, bit rates/bandwidth on a bearer common to/shared by the usage group, and applications/services using a bearer common to/shared by the usage group.

4. The apparatus of claim 2, wherein the usage group comprises a usage monitoring group for monitoring volume or time based usage of resources shared by the usage monitoring group.

5. A method for use by an apparatus of a communication network, the method comprising:

receiving a session establishment request for a user or user equipment attaching to the communication network;

detecting that the user or user equipment belongs to a usage group, based on group identity information that is allocated to the user or user equipment and identifies the usage group, wherein the detecting comprises selecting a rules function out of several rules functions and requesting the group identity information from the selected rules function based on an identifier of the user or user equipment received with the session establishment request for the user or user equipment;

detecting, based on the group identity information, whether or not a first rules function out of the several rules functions has been allocated to another user or user equipment of the usage group;

in case it is detected that no first rules function has been allocated to another user or user equipment of the usage group, using for the user or user equipment the selected rules function, and, in case it is detected that the first rules function has been allocated to another user or user equipment of the usage group, sending a cancellation message to cancel the connection towards the selected rules function; and sending a request message to request the session establishment from the first rules function or sending a redirect message to redirect the user or user equipment to the first rules function, for requesting the session establishment from the first rules function.

6. An apparatus of a communication network, the apparatus configured to:

receive a session establishment request for a user or user equipment attaching to the communication network;

detect that the user or user equipment belongs to a usage group, based on group identity information that is allocated to the user or user equipment and identifies the usage group, wherein the apparatus, to detect that the user or user equipment belongs to a usage group, is configured to select a rules function out of several rules functions and request the group identity information from the selected rules function based on an identifier of the user or user equipment received with the session establishment request for the user or user equipment;

detect, based on the group identity information, whether or not a first rules function out of the several rules functions has been allocated to another user or user equipment of the usage group in case it is detected that no first rules function has been allocated to another user or user equipment of the usage group, use for the user or user equipment the selected rules function, and, in case it is detected that the first rules function has been allocated to another user or user equipment of the usage group, send a cancellation message to cancel the connection towards the selected rules function; and send a request message to request the session establishment from the first rules function or send a redirect message to redirect the user or user equipment to the first rules function, for requesting the session establishment from the first rules function.

7. The apparatus of claim 6, wherein the usage group manages usage of at least one of bearers common to/shared by the usage group, bit rates/bandwidth on a bearer common to/shared by the usage group, and applications/services using a bearer common to/shared by the usage group.

8. The apparatus of claim 6, wherein the usage group comprises a usage monitoring group for monitoring volume or time based usage of resources shared by the usage monitoring group.

* * * * *